United States Patent
Tornqvist et al.

(10) Patent No.: US 9,677,888 B2
(45) Date of Patent: Jun. 13, 2017

(54) DETERMINING SENSOR ORIENTATION IN INDOOR NAVIGATION

(71) Applicant: SenionLab AB, Linkoping (SE)

(72) Inventors: David Tornqvist, Linkoping (SE); Fredrik Gustafsson, Linkoping (SE); Per Skoglar, Linkoping (SE)

(73) Assignee: SENIONLAB AB, Linkoping (SE)

( * ) Notice: Subject to any disclaimer, the term of this patent is extended or adjusted under 35 U.S.C. 154(b) by 0 days.

(21) Appl. No.: 14/736,813

(22) Filed: Jun. 11, 2015

(65) Prior Publication Data
US 2016/0363448 A1   Dec. 15, 2016

(51) Int. Cl.
| G06C 21/00 | (2006.01) |
| G06C 19/00 | (2006.01) |
| G01C 21/16 | (2006.01) |
| G01C 17/38 | (2006.01) |
| G01C 21/20 | (2006.01) |
| G01C 25/00 | (2006.01) |

(52) U.S. Cl.
CPC ........... *G01C 21/165* (2013.01); *G01C 17/38* (2013.01); *G01C 21/16* (2013.01); *G01C 21/206* (2013.01); *G01C 25/005* (2013.01)

(58) Field of Classification Search
CPC ................................. G01C 21/16; G01B 21/24
See application file for complete search history.

(56) References Cited

U.S. PATENT DOCUMENTS

| 2013/0090881 A1* | 4/2013 | Janardhanan | G01C 22/006 702/104 |
| 2015/0354951 A1* | 12/2015 | Ali | G01C 21/16 702/141 |
| 2015/0378159 A1* | 12/2015 | Lundberg | G02B 27/017 345/8 |

\* cited by examiner

*Primary Examiner* — Jelani Smith
(74) *Attorney, Agent, or Firm* — Miller, Matthias & Hull LLP

(57) ABSTRACT

A method and system are provided for improved pedestrian dead reckoning. In an embodiment, the crab angle of a device, i.e., the angle by which the device direction of travel differs from the device orientation, is determined via the processing of measurements from a vector accelerometer. The measured acceleration vector is rotated so that one component is vertical, and the crab angle is then found by determining a horizontal direction having the greatest energy. Correlations between the two horizontal acceleration components and the vertical acceleration component may be computed to determine the user's gait, further improving dead reckoning, e.g., for improving indoor position resolution.

12 Claims, 7 Drawing Sheets

DETERMINING SENSOR ORIENTATION IN INDOOR NAVIGATION

TECHNICAL FIELD

The present disclosure is related generally to indoor navigation and, more particularly, to a system and method for determining a heading direction of a portable electronic device relative to a direction motion of a user having the device.

BACKGROUND

Pedestrians in new surroundings are often unable to efficiently navigate between desired locations. Indeed, in some cases such a pedestrian cannot even identify their current location with any accuracy. Pedestrian navigation while outdoors is fairly easy to address using radio networks. For example, global navigation satellite systems (GNSS) give worldwide coverage with an accuracy level of approximately 10 meters. Cellular networks provide a rough position in the order of hundreds meters. Similarly, WiFi networks can be mapped and used for localization with an accuracy of around 30 meters.

While GNSS may be suitable for short periods, mobile devices have limited power resources, and continuous use of GNSS for localization will quickly drain the device batteries. In addition, GNSS are not available indoors. The use of WiFi requires extensive mapping, which is possible some cases, but is not possible in certain critical applications such as guiding rescue personnel. Further, in surveillance applications, whether indoors or outdoors, continuous logging of the position is needed. In short, navigation protocols that use outside aids such as GNSS and WiFi are undesirable in many applications.

Pedestrian navigation that does not rely upon outside aids is referred to as pedestrian dead-reckoning (PDR). In this technique, a step detector may be used to count the number of steps taken by the user. Given an approximate step length, the traveled distance is calculated as proportional to the number of steps. However, to resolve a traveled trajectory, the heading (direction of movement) is also needed. Although most portable electronic devices can determine their own orientation, the relative orientation of the device with respect to the body of the pedestrian depends on the user. In general, the direction of user movement (heading) is not the same as the direction indicated by device orientation. Regardless, the device may swinging unpredictably as the user walks, further reducing the efficacy of using device orientation to determine user heading if the swinging motion is not compensated.

While the present disclosure is directed to a system that can eliminate certain shortcomings noted in this Background section, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize any item of prior art.

As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a comprehensive discussion of the disclosed principles, an overview is given to aid the reader in understanding the later discussion. As noted above, it is difficult to provide pedestrian navigation assistance in a way that is effective, low power, and usable indoors. However, in an embodiment, the heading direction of a device relative the direction motion of the pedestrian (herein "crab angle") is calculated based on accelerometer data and is used to improve PDR.

For example, in an embodiment, given device magnetometer data, the crab angle is added to the calculated compass direction to obtain the user's direction of motion. In a further embodiment, with respect to gyroscopic data indicating angular movement, the crab angle makes it possible for the device to determine whether the rotation is due to a change in the overall direction of motion, or a change in how the device is held or stored relative the user.

In a further embodiment, the crab angle is used to compensate for the periodic disturbances caused by the user's gait. In this embodiment, the user's steps are first detected with a high repeatability and stability. This will provide reliable values of IMU (inertial measurement unit) data that are taken from the same phase of the gait. Further, the principle of synchronous averaging can be used to improve the signal to noise ratio further. In this way, the orientation of the device relative the body of the pedestrian can be computed with a quality that is sufficient for accurate PDR.

Figure 1:
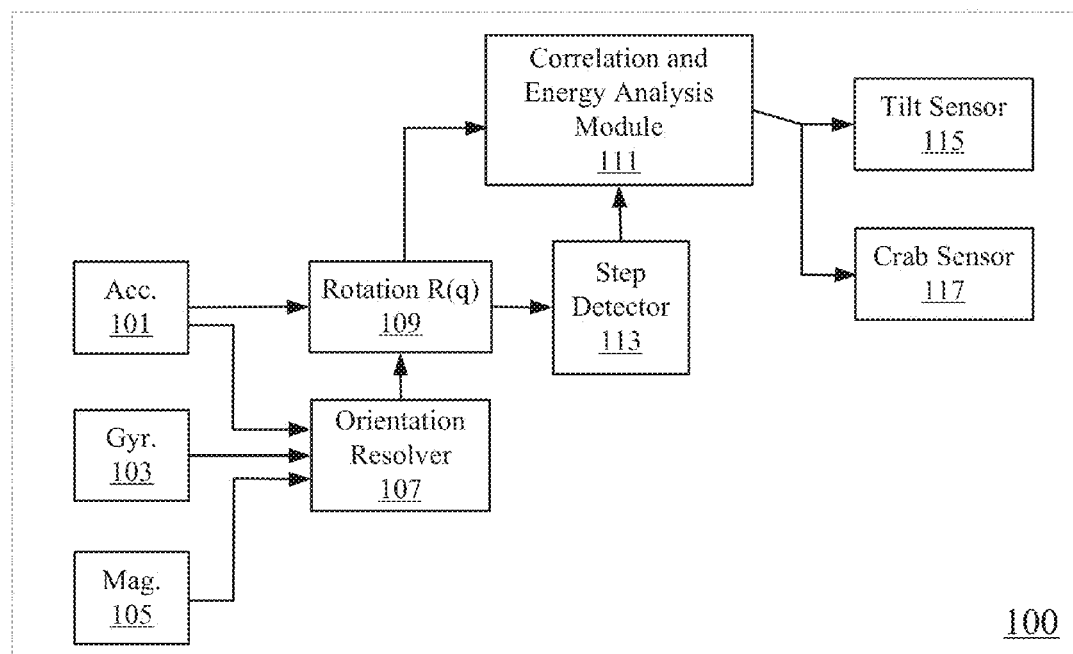
FIG. 1 is a modular diagram showing a PDR system in overview in accordance with an embodiment of the disclosed principles.

With this overview in mind, and turning now to a more detailed discussion in conjunction with the attached figures, FIG. 1 shows an overview of one embodiment of high-performance PDR. As can be seen, FIG. 1 shows a block diagram of modules or operations, starting with available sensor information, then estimating the orientation of the device and rotating the vector measurements, followed by various signal processing algorithms to detect user steps, synchronously sampling the vector signals at the step frequency, and estimating heading angle.

In the illustrated embodiment, the PDR system 100 includes a number of sensors including an accelerometer set 101, a gyroscope set 103, and a magnetometer 105. These sensors provide data to further modules including an orientation resolver 107, which determines a device orientation based on the sensor inputs. The accelerometer set 101 also feeds into a Rotation module 109, which determines device rotation based on sensed acceleration.

A correlation and energy analysis module 111 serves to determine a bearing perpendicular to vertical and having maximal acceleration energy based on the input from the prior modules. In addition, a gait detector 113 may be used to improve the bearing determination through correlation of energy with the user's gait, e.g., for synchronous averaging.

Finally, the correlation and energy analysis module 111 provides an output to a tilt sensor 115 and a crab sensor module 117. The crab sensor module 117 output may be differenced from the magnetometer 105 reading to produce a heading for pedestrian dead reckoning. For example, given the travel heading and user step count, the user position as the travel direction and distance of travel from last estimate.

Before discussing the calculations in greater detail, certain definitions or conventions may be useful:
  World coordinates are given as X, Y, Z (east, north, up);
  Sensor coordinates are given as x, y, z (right, forward, up on device);
  The sensor orientation is represented by q, which is the Euler angles (yaw, pitch and roll) or the quaternions;
  The rotation matrix R(q) rotates from sensor coordinates to world coordinates. For instance, without acceleration, the accelerometer senses $a=R(q)(0;0;g)^T$, where g is the gravitational constant;
  Body coordinates that will not be explicitly used;
  The Heading $\psi$, is the direction of the velocity vector in world coordinates;
  The Device tilt angles are denoted as $\theta$ and $\phi$ (around x and y, respectively).
  The Crab angle $\delta$ is the angular difference between the sensor x direction and the velocity direction. This angle is a multiple of 90 degrees under normal handheld conditions.

Figure 2:
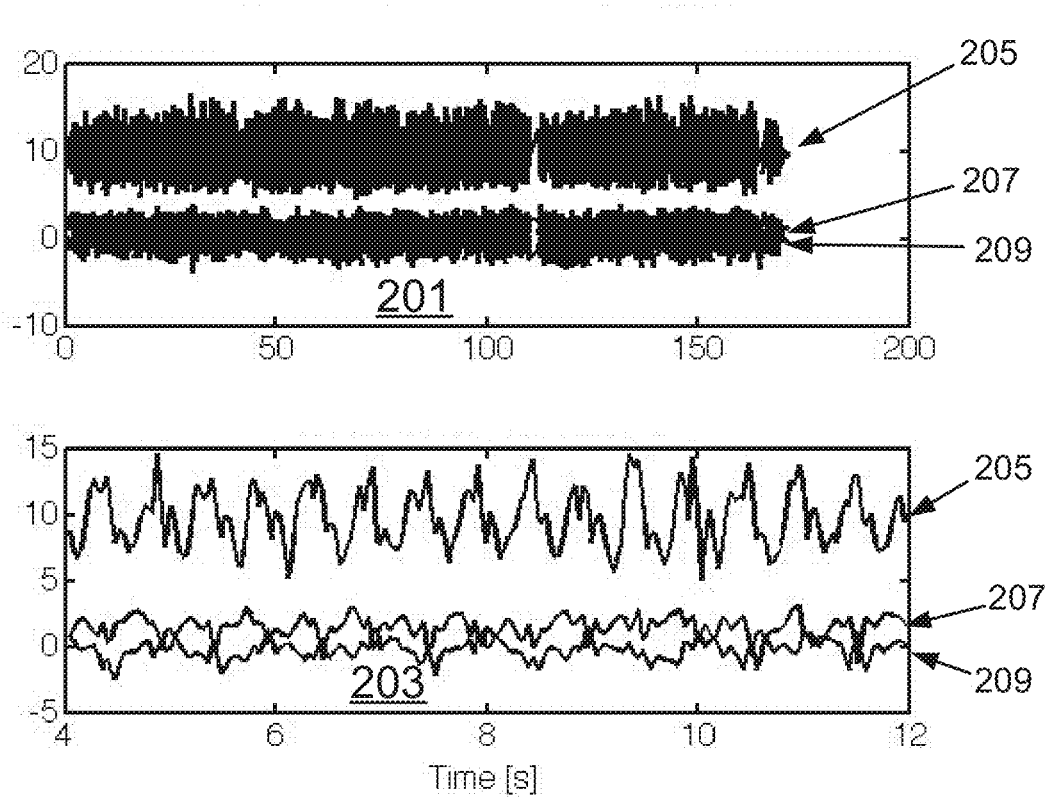
FIG. 2 shows raw accelerometer data from an experiment wherein a device was handheld and aligned to a heading direction.

FIG. 2 shows raw accelerometer data from an experiment wherein a device was handheld and aligned to a heading direction. The gait in this experiment was very regular, making standard transform-based spectral estimation possible. The top plot 201 shows raw accelerometer data at a sampling frequency of 25 Hz. As can be seen, the z direction signal 205 is much greater than the signals in the x and y directions (indistinguishable in cluster 207). The second plot 203 shows a time-zoomed view of a portion of plot 201, wherein the user's gait can be clearly seen in the $a_z$ data.

Figure 3:
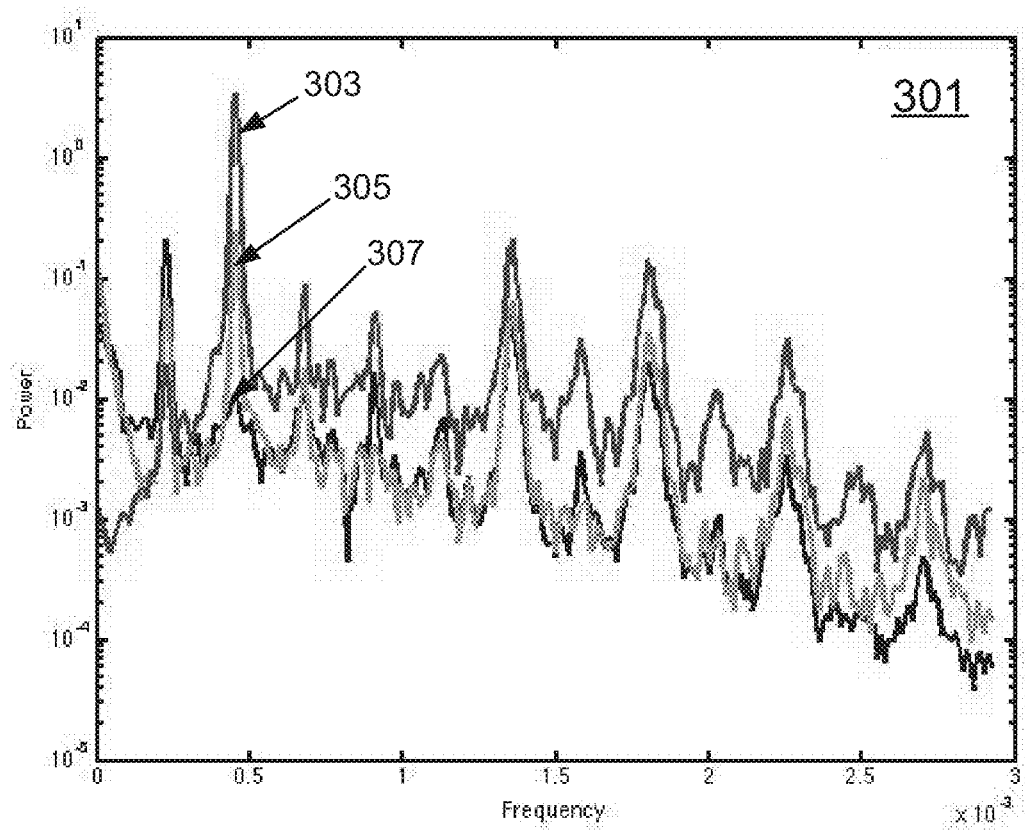
FIG. 3 shows a frequency spectrum of the accelerometer signals.

The frequency spectrum of the accelerometer signals illustrated in the plot 301 of FIG. 3 confirms that $a_z$ (trace 303) contains the most energy at the step frequency (indeed about 150% more than $a_x$ 307 and $a_y$ 305). As such, step detection based on $a_z$, after rotation to world coordinates ($a_Z$), is effective.

Moreover, $a_y$ (forward direction) has 10 times more energy than $a_x$ at the step frequency. This means that the crab angle $\delta$ can be determined based on finding the direction of greatest energy. In one embodiment, a simple implementation is based on a correlation of $a_z$ with $a_x$ and $a_y$, respectively.

The overall result is that step detection can be effectively based on $a_z$, while the crab angle $\delta$ can be estimated based on the correlation between the accelerometer dimensions projected onto the horizontal plane. Here, the orientation estimate assists when the device is not held in the same position at all times (as in the illustrations in this section). With respect to orientation of the device, relative orientation is estimated primarily using the gyroscope data. In this regard, pure integration gives a good orientation value with relatively little drift, e.g., no more than a few degrees per minute.

Measurement updates for orientation are based on accelerometer and magnetometer data. In particular, the accelerometer measures gravity when no linear acceleration is present. This provides an accurate indication of the Z direction, so that the device can determine the horizontal plane accurately. Similarly, the magnetometer measures course direction when no magnetic disturbance is present. This information is useful in the filter at a later stage.

Those of skill in the art will appreciate that various different implementations of the disclosed principles are possible. An exemplary embodiment based on a Kalman filter is described. The time update is given by $$\hat{q}_{k+1|k}=F(T_k,\omega)\hat{q}_{k|k}, \quad (1a)$$

$$P_{k+1|k}=F(T_k,\omega)P_{k|k}F^T(T_k,\omega)+G(T_k,\hat{q}_{k|k})R_\omega G^T(T_k,\hat{q}_{k|k}), \quad (1b)$$

where $$F(T_k,\omega)=I_4-T_k/2S(\omega), \quad (2a)$$

$$G(T_k,q)=-T_k/2\overline{S}(q). \quad (2b)$$

The measurement update for the accelerometer is given by $$\hat{q}_{k|k}=\hat{q}_{k|k-1}+K_k\epsilon_k, \quad (3a)$$

$$\epsilon_k=(0,0,-g)^T-R(\hat{q}_{k|k-1})a_k. \quad (3b)$$

The update is performed only if $|\|a\|-g|$ is small. In the above, $T_k$ denotes the elapsed time since the last measurement, $\omega$ is the turn rate related to the gyro measurement, q is the rotation state, S and $\overline{S}$ are rotation matrices and $K_k$ is the Kalman gain.

There are several ways in which to incorporate the magnetometer data as a measurement. However, the device orientation relative to the horizontal plane is the most important product for PDR, and thus in this application the accelerometer measurement is the most important.

In an embodiment, a step detector is implemented based on the application of a band-pass (BP) filter to $a_z$. Alternatively the BP filter may be applied to $a_Z$ after orientation estimation and rotation to world coordinates. It can generally be assumed that a natural gait has a step time between $T_1$ and $T_2$, which defines a frequency interval $[1/T_2; 1/T_1]$ for the BP filter. The algorithm is as follows:
  1. BP filter $a_z$;
  2. Detect level crossing h m/s$^2$; and
  3. If a level crossing occurs at least $T_1$ after the previous detection, let current time t define a new detection $t_k$ for step k.

Accurate and well-phased step detections are beneficial for both dead-reckoning and synchronous averaging, as discussed below.

Given the step detections, the signals can now be averaged over these segments:

$$\bar{\alpha}[k] = \frac{1}{t_k - t_{k-1}} \sum_{t=t_{k-1}}^{t_k} \alpha(t).$$

Figure 4:
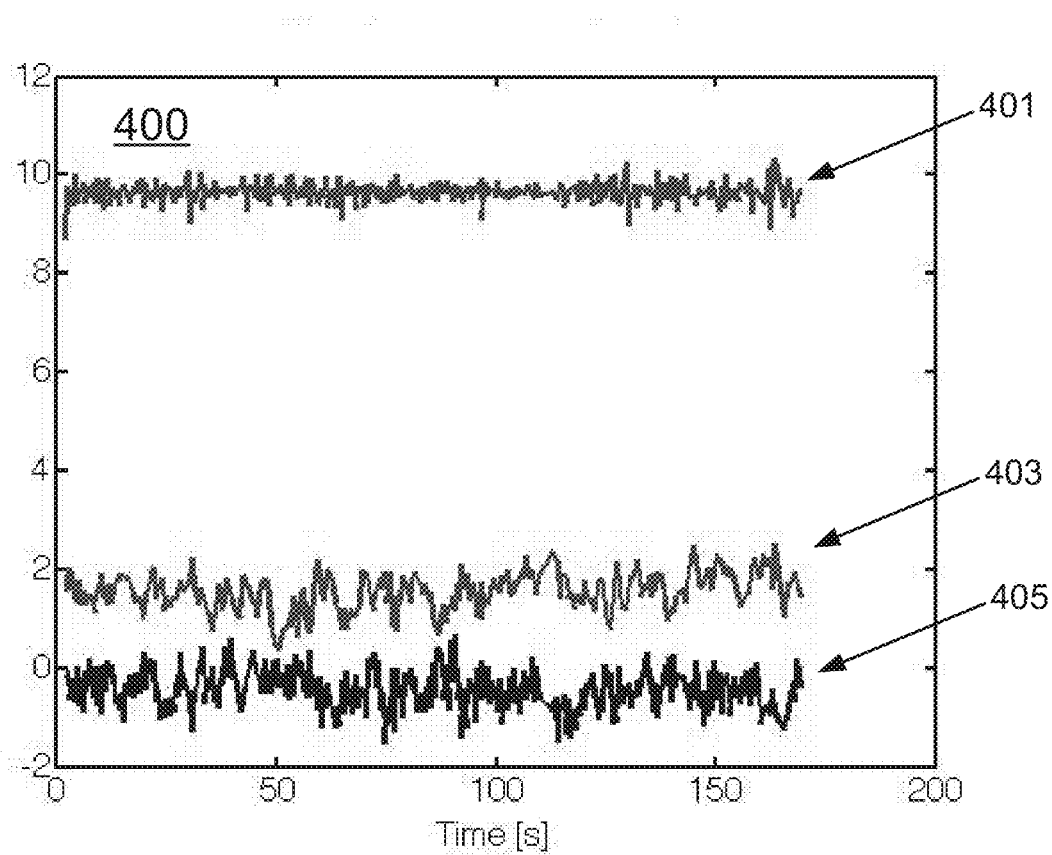
FIG. 4 shows signal improvement yielded by synchronous averaging in accordance with an embodiment of the disclosed principles.

Here $a(t)=R(q)y_t^{acc}$ represents the device acceleration in sensor coordinates projected onto the horizontal plane, making the value independent of heading. Averaging over a cycle rather than a fixed time interval can be referred to as synchronous averaging. This procedure provides a stable value for acceleration, as illustrated in FIG. 4. In particular, the plot 400 of FIG. 4 shows signal improvement yielded by synchronous averaging. As can be seen, the accelerometer signals 401, 403, 405 are much smoother after synchronous averaging than previously (see FIG. 2).

In a similar manner, synchronous correlation can be used for estimation of the crab angle. It is defined as:

$$c_{xz}[k] = \frac{1}{t_k - t_{k-1}} \sum_{t=t_{k-1}}^{t_k} \alpha_x(t)\alpha_z(t) - \bar{\alpha}_x[k]\bar{\alpha}_z[k]$$

$$c_{yz}[k] = \frac{1}{t_k - t_{k-1}} \sum_{t=t_{k-1}}^{t_k} \alpha_y(t)\alpha_z(t) - \bar{\alpha}_y[k]\bar{\alpha}_z[k].$$

The human gait causes much larger variations in acceleration in the longitudinal (forward) than the lateral (sideward) direction. Thus, the crab angle can be estimated from synchronous correlation as follows:

$$\hat{\delta}[k] = \arctan(c_{yz}[k], c_{xz}[k]).$$

Figure 5:
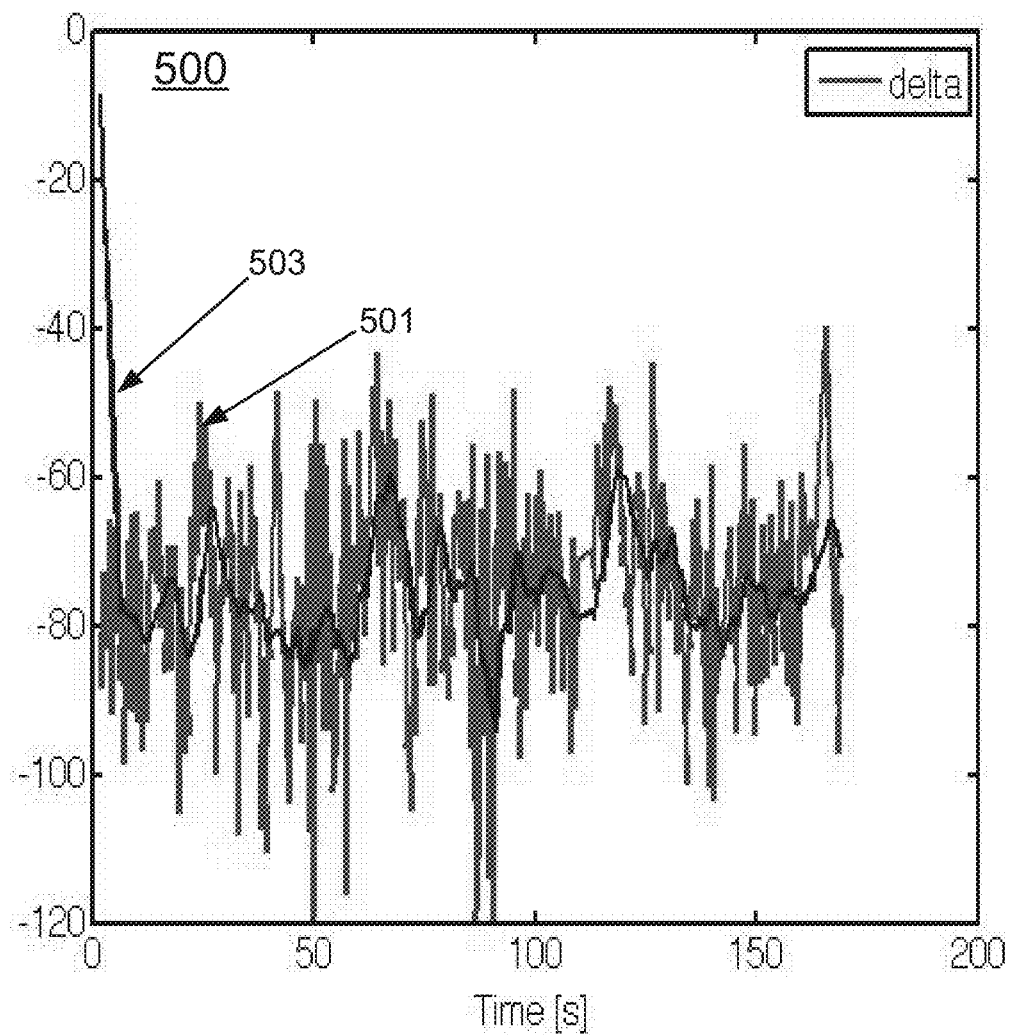
FIG. 5 is a data plot showing the estimated crab angle in accordance with an embodiment of the disclosed principles.

FIG. 5 shows the estimated crab angle based on this expression. Specifically, the plot 500 shows snapshot estimates 501 for each step cycle as well as smoothed estimates 503. In the example, the crab angle reveals that the device is rotated about 15 degrees clockwise relative to walking direction. That is, the device is not pointing straight along its y axis, but is pointed a bit to the right, which is natural if carried by a right-handed person.

Each point estimate is noisy with a standard deviation of about 10 degrees. However, averaging over one minute, or 100 steps, decreases the standard deviation to 1 degree. That is, the potential of PDR after crab angle correction is a trajectory which is quite well aligned to the world coordinate system. It will be appreciated that the crab angle can suddenly change, e.g., if the user changes the position of the device relative to the body.

The tilt angles can be computed from the synchronous averaging as follows:

$$\hat{\phi}[k] = \arctan(\bar{a}_y[k], \bar{a}_z[k]),$$

$$\hat{\theta}[k] = \arctan(\bar{a}_x[k], \bar{a}_z[k]).$$

Figure 6:
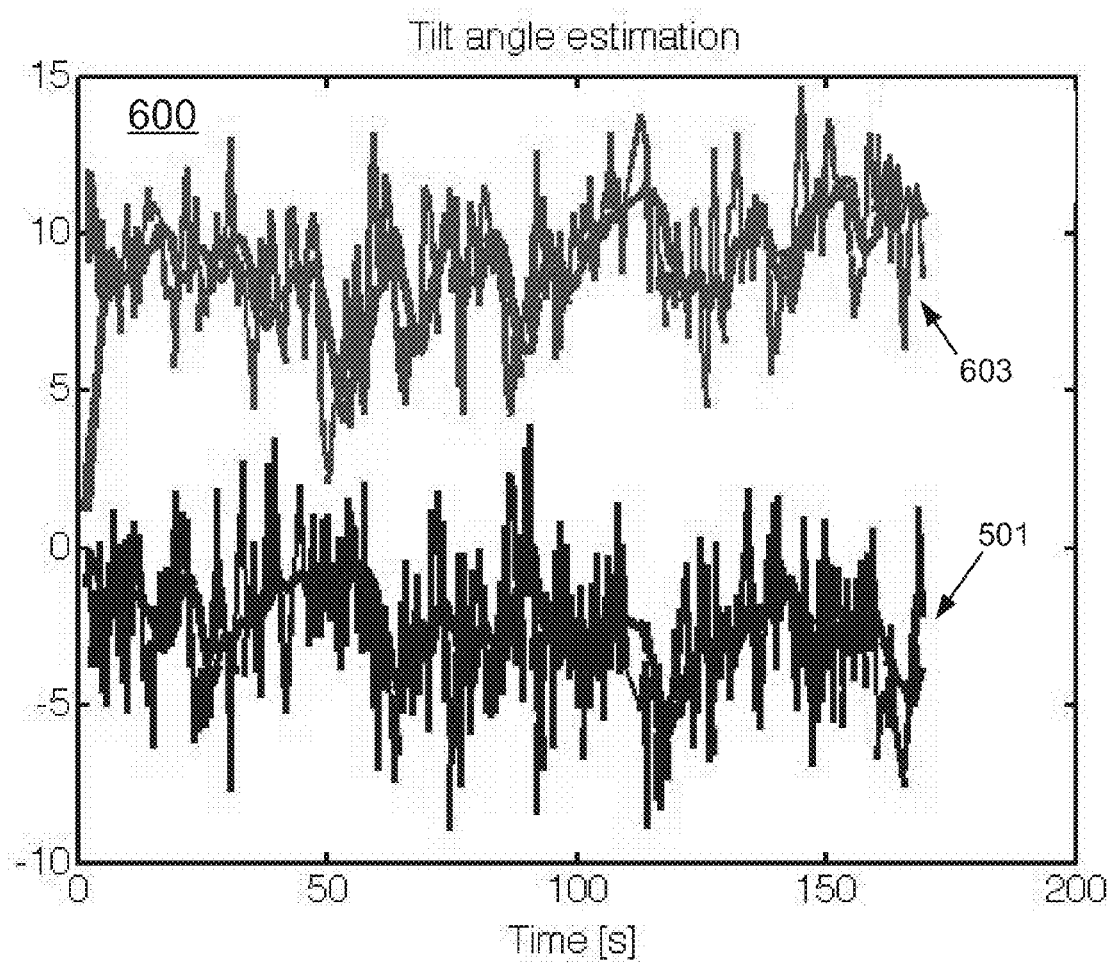
FIG. 6 is a data plot showing estimated tilt angles in accordance with an embodiment of the disclosed principles.

The resulting angle estimates θ (601) and φ (603) are illustrated in the plot 600 of FIG. 6. As can be seen, there is one tilt estimate per step cycle. In an embodiment, further low-pass filtering action is performed before this value is used in subsequent applications.

As noted above, the crab angle is needed to correctly align the trajectory to world coordinates, but the crab angle can be changed by the user. Usually, such a change is abrupt relative to the step cycle. For example, it does not take long time to take a cell phone from a pocket. To avoid an incorrect PDR trajectory, such changes should be detected quickly. There are several cues for this event, which, when they occur abruptly, should result in re-initialization of the crab angle. For example, a user-driven change will result in a change in the tilt angles, the crab angle and/or the downward direction z of the device provided by $R(q)(0; 0; 1)^T$. When the crab angle is re-initialized, the previous heading direction should be used until a stable value is obtained.

Referring again to FIG. 1, the Kalman filter yields $q_k$ for the sensor orientation, where the horizontal component $\psi_k^S$ is of interest for navigation. This heading angle is given in the sensor coordinate system, indicated with the superscript S. By subtracting the estimated crab angle $\delta_k$, the heading of the body motion is generated. Integrating the motion with an assumed step length of $L_k$ gives the horizontal position $X_k$, $Y_k$ relative to the starting position $X_0$, $Y_0$, such that in one embodiment PDR is modeled as:

$$X_{k+1} = X_k + (L_k + v_k^L)\cos(\psi_k^S - \delta_k), \quad (4)$$

$$Y_{k-1} = Y_k + (L_k + v_k^L)\sin(\psi_k^S - \delta_k), \quad (5)$$

$$\psi_{k-1}^S = \psi_k^S + T_k\dot{\psi}_k^S, \quad (6)$$

$$\dot{\psi}_{k-1}^S = \dot{\psi}_k^S + v_k^\psi. \quad (7)$$

Here $v_k$ denotes stochastic disturbances on step length and course change, respectively.

One feature with this conceptual model is that all measurements can be treated in the same way as a measurement update where integrity check is performed before a measurement is accepted. Measurements include:

Compass (magnetometers) that measures $\psi_k$;
Gyro that measures $\dot{\psi}_k$;
Zero velocity updates (ZUPT) for foot-mounted devices, which provide a measurement of both step length $L_k$ and direction of change $\dot{\psi}_k$;
Signal strength fingerprinting that is a nonlinear function of position $(X_k, Y_k)$; and
Other radio measurements such as time of arrival, direction of arrival etc.

The calculated crab angle exposes changes in device orientation that can invalidate both compass and gyroscope measurements.

In an embodiment, the particle filter is used as a nonlinear filter. It has many useful features for indoor navigation. For instance, the particle filter can handle the nonlinear rotation operations without linearization, and it can evaluate a large number of hypothesis on the trajectory in real-time on standard devices. For this approach, it adds the benefit of soft decisions. That is, normally an outlier rejection test or hypothesis test leads to a hard decision that is fed back to the filter. An incorrect decision will then lead to a decision feedback problem that may cause divergence in the filter. The feature of having a large number of independent hypotheses in the particle filter enables soft decisions.

Figure 7:
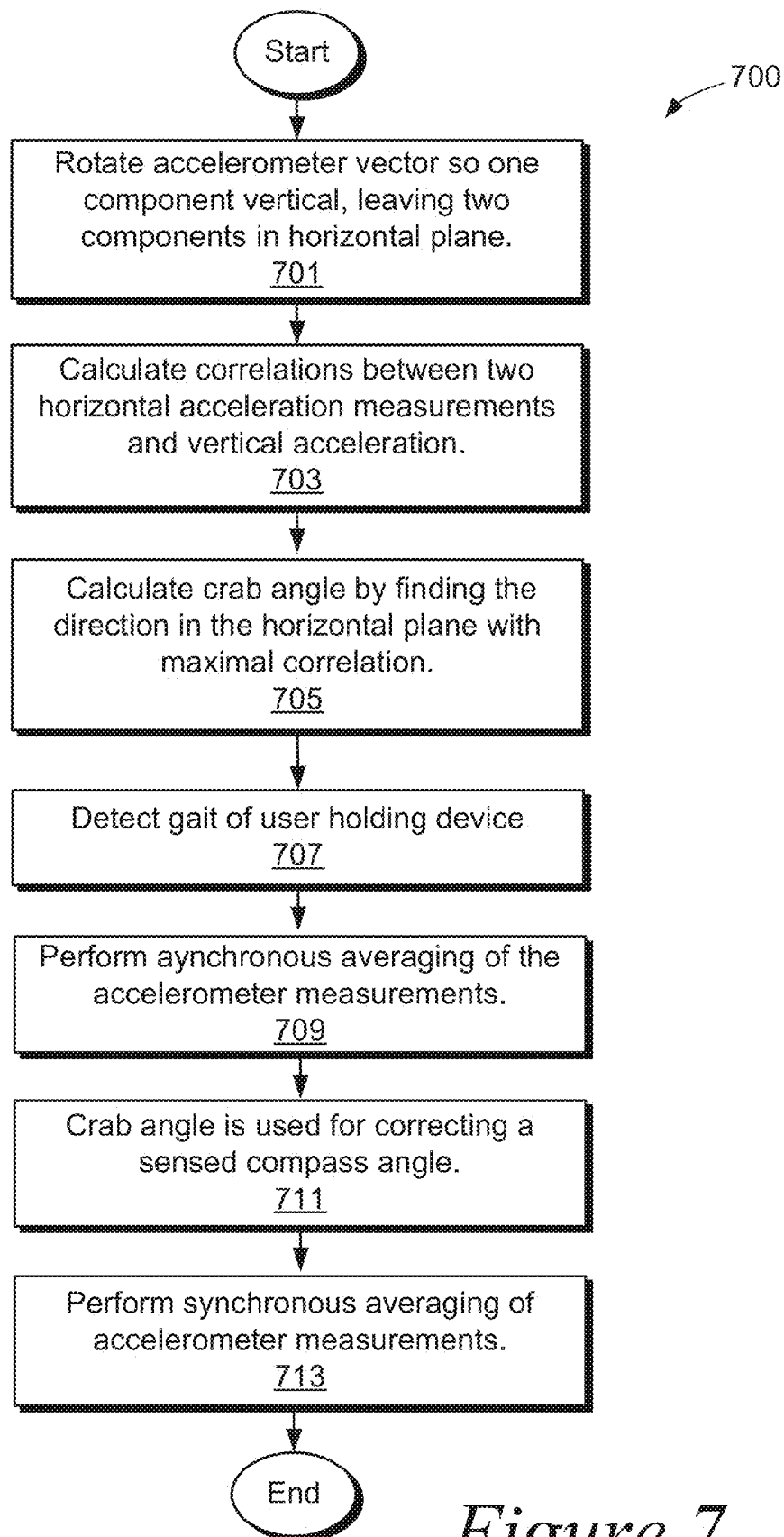
FIG. 7 is a flow chart showing a process in accordance with an embodiment of the disclosed principles.

Although the disclosed principles may be implemented in a number of ways, FIG. 7 shows a process 700 for performing pedestrian dead reckoning in accordance with an embodiment. At stage 701 of the process 700, a measured accelerometer vector is rotated so that one component is parallel to the vertical, leaving two components in the horizontal plane. Next at stage 703, correlations between the two horizontal acceleration measurements and the vertical acceleration are calculated and the crab angle is derived at stage 705 by finding the direction in the horizontal plane with maximal correlation.

At stage 707 of the process 700, a gait of a user holding the device is detected, and synchronous averaging of the accelerometer measurements are then calculated at stage 709 to improve crab angle estimates. The crab angle may then be used in one of several ways to improve pedestrian dead reckoning.

For purposes of illustration, two such uses will be listed. Thus, at stage 711, the crab angle is used for correcting a sensed compass angle. Additionally or alternatively, the crab angle is employed at stage 713 to validate course change measurements produced by one or more device gyroscopes, in order to improve pedestrian dead reckoning. In an embodiment, the process 700 is a periodic process. In this case, the process 700 returns to stage 701 from stage 713.

It will be appreciated that a new system and method for determining orientation for indoor navigation have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for determining a crab angle of a portable electronic device carried by a user, wherein the crab angle is an angle by which the device direction of travel differs from the device orientation, and wherein the device is provided with a vector accelerometer, the method comprising:
    detecting a step of the user at a fixed phase of the user's step cycle using the vector accelerometer and acquiring a plurality of acceleration vectors;
    projecting each acceleration vector into a horizontal plane that is perpendicular to a vertical direction;
    determining an energy vector for each projected acceleration vector over one step cycle; and
    computing the device crab angle by finding a direction in the horizontal plane having maximal energy associated therewith.

2. The method in accordance with claim 1, further comprising computing correlations between two projected horizontal acceleration components and a vertical acceleration component to find an acceleration that is due to a gait of the user.

3. The method in accordance with claim 2, further comprising performing synchronous averaging of the computed correlations to improve crab angle estimates.

4. The method in accordance with claim 1, further comprising using the crab angle to correct a compass angle, in order to improve pedestrian dead reckoning.

5. The method in accordance with claim 1, wherein the device is provided with a gyroscope sensor, further comprising using the crab angle to validate course changes measured by the gyroscope sensor in order to improve pedestrian dead reckoning.

6. The method in accordance with claim 5, further comprising performing pedestrian dead reckoning during indoor position resolution.

7. A portable electronic device that provides pedestrian dead reckoning, the portable electronic device comprising: an accelerometer for detecting an acceleration vector; and a processor, the processor being configured to detect a step of a user at a fixed phase of the user's step cycle using the vector accelerometer and acquiring a plurality of acceleration vectors and project the acceleration vectors into a horizontal plane perpendicular to a vertical direction, determine an energy vector for each projected acceleration vector over one step cycle and compute a crab angle of the device by determining a direction in the horizontal plane with maximal energy, wherein the crab angle is an angle by which the determined direction differs from the device orientation.

8. The portable electronic device in accordance with claim 6, wherein the processor is further configured to compute correlations between two horizontal acceleration components and a vertical acceleration to find the acceleration that is due to a gait of the user.

9. The portable electronic device in accordance with claim 8, wherein the processor is further configured to detect a gait of a user holding the device and perform synchronous averaging of the computed correlations to improve crab angle estimates.

10. The portable electronic device in accordance with claim 9, wherein the processor is further configured to correct a compass angle using the crab angle in order to improve pedestrian dead reckoning.

11. The portable electronic device in accordance with claim 7, wherein the processor is further configured to use the crab angle to validate course changes measured by the gyroscopes, in order to improve pedestrian dead reckoning.

12. The portable electronic device in accordance with claim 11, wherein the processor is further configured to perform pedestrian dead reckoning during indoor position resolution.

* * * * *